US012785284B2

(12) United States Patent
Jeon

(10) Patent No.: US 12,785,284 B2
(45) Date of Patent: Nov. 3, 2026

(54) ANTENNA MODULE

(71) Applicant: NEXWAVE INC., Daejeon (KR)

(72) Inventor: Jin-Wan Jeon, Daejeon (KR)

(73) Assignee: NEXWAVE INC., Daejeon (KR)

(*) Notice: Subject to any disclaimer, the term of this patent is extended or adjusted under 35 U.S.C. 154(b) by 50 days.

(21) Appl. No.: 18/918,113

(22) Filed: Oct. 17, 2024

(65) Prior Publication Data

US 2025/0038418 A1 Jan. 30, 2025

Related U.S. Application Data

(63) Continuation of application No. PCT/KR2022/015884, filed on Oct. 18, 2022.

(30) Foreign Application Priority Data

Oct. 13, 2022 (KR) ........................ 10-2022-0131030
Oct. 14, 2022 (KR) ........................ 10-2022-0132174
Oct. 14, 2022 (KR) ........................ 10-2022-0132342

(51) Int. Cl.
*H01Q 13/10* (2006.01)
*H01Q 1/22* (2006.01)

(52) U.S. Cl.
CPC ........... *H01Q 13/10* (2013.01); *H01Q 1/2283* (2013.01)

(58) Field of Classification Search
CPC ............................. H01Q 13/10; H01Q 1/2283
See application file for complete search history.

(56) References Cited

U.S. PATENT DOCUMENTS

| | | | | |
|---|---|---|---|---|
| 7,405,698 | B2 * | 7/2008 | de Rochemont | H01Q 1/38 343/909 |
| 8,598,969 | B1 | 12/2013 | Walker et al. | |
| 9,581,288 | B2 | 2/2017 | Nummerdor | |
| 2019/0181126 | A1 * | 6/2019 | Cheah | H01L 23/5389 |
| 2019/0260109 | A1 * | 8/2019 | Gu | H01Q 1/2283 |
| 2020/0303806 | A1 * | 9/2020 | Wu | H01Q 1/2283 |
| 2020/0395675 | A1 * | 12/2020 | Han | H01Q 9/0414 |
| 2021/0036405 | A1 * | 2/2021 | Han | H01L 23/66 |

FOREIGN PATENT DOCUMENTS

| | | |
|---|---|---|
| KR | 10-2013-0042908 | 4/2013 |
| KR | 10-1581225 | 12/2015 |
| KR | 10-1783954 | 11/2017 |
| KR | 10-2019-0009232 | 1/2019 |
| KR | 10-2020-0060975 | 6/2020 |
| KR | 10-2145219 | 8/2020 |
| KR | 10-2022-0001664 | 1/2022 |
| KR | 10-2022-0054060 | 5/2022 |

* cited by examiner

*Primary Examiner* — Hai V Tran
(74) *Attorney, Agent, or Firm* — PnK IP LLC

(57) ABSTRACT

Proposed is an antenna module that includes an antenna substrate including an antenna, a package substrate to which a radio-frequency integrated circuit chip is mounted, and in which a signal transmission line configured to transmit a signal of the radio-frequency integrated circuit chip is provided; and an interconnection member positioned between the antenna substrate and the package substrate to connect the antenna substrate and the package substrate, and provided with a slot through which a radio frequency signal passes.

14 Claims, 7 Drawing Sheets

ANTENNA MODULE

CROSS REFERENCE TO RELATED APPLICATIONS

This application is a Bypass Continuation of International Patent Application No. PCT/KR2022/015884, filed on Oct. 18, 2022, which claims priority from and the benefit of Korean Patent Application No. 10-2022-0131030, filed on Oct. 13, 2022, Korean Patent Application No. 10-2022-0132174, filed on Oct. 14, 2022, and Korean Patent Application No. 10-2022-0132342, filed on Oct. 14, 2022, each of which is hereby incorporated by reference for all purposes as if fully set forth herein.

BACKGROUND

Field

Embodiments of the invention relate generally to an antenna module capable of improving radio frequency communication performance by connecting an antenna substrate with a package substrate using an interconnection member in which a slot is formed.

Discussion of the Background

Wireless communication data traffic has increased rapidly, and electronic devices related to wireless communication have become high performance. The development of technologies related to autonomous driving, VR/AR, IoT-related technologies, remote healthcare, and ultra-high resolution image transmission that require rapid transmission and reception of a large amount of data in a wireless network has been accelerated, and components for 5G and millimeter wave band and related technologies are required to support the development.

In order to increase the data transmission amount of wireless communication, a usable frequency of wireless communication components applied in a wireless transmission and reception system needs to be increased and bandwidth needs to be increased. In addition, in the wireless transmission and reception system, as the usable frequency band is increased, the number of antennas needs to increase in order to raise the power of transmitted and received signals and improve the signal-to-noise ratio.

Therefore, a wireless transmission and reception system for 5G, especially in the millimeter wave band, inevitably includes multiple antennas in an array and an antenna module for performing a beamforming function to steer beams.

An antenna module or a system for performing a function of forming and adjusting electromagnetic waves typically includes many antenna elements, various integrated circuit chips, and interconnection parts and control lines thereof. The antenna module further includes various circuits, such as a multi-layer structure of antenna elements, a radio frequency signal transfer structure thereof, a radio-frequency integrated circuit (RFIC) chip for performing a beamforming function, an intermediate frequency distribution circuit, a local oscillator, and a control circuit and a bias circuit related thereto.

The antenna module or system is an essential element of a wireless communication system, and requires characteristics such as high output, low signal loss, performing a beamforming function, high reception sensitivity, low cost, and easy compatibility and expansion.

In the meantime, in ultra-high frequency bands such as 12-18 GHz, 24 GHZ, 28 GHZ, 39 GHz, 60 GHz bands, radio frequency (RF) signals are easily absorbed and lost in a signal transfer process, which may cause a rapid degradation in the quality of wireless communication.

Therefore, in the case of an antenna module in an ultra-high frequency band, technologies securing gain of an antenna, minimizing a connection loss between an antenna and an RFIC, minimizing signal interference due to complex signal line arrangement, and securing the spacing (usually spacing of 0.5 times the signal wavelength) between antenna arrays need to be developed.

To achieve these characteristics, an antenna module in an ultra-high frequency band, such as a millimeter wave, includes multiple antenna arrays for increasing power and performing beamforming functions, and integrated circuit chips for implementing these.

In the meantime, as a frequency used in a wireless communication system increases, the size of an antenna and the width of a transmission line in the corresponding band decrease, and the degree of integration of circuits for realizing these increases.

In order to configure an antenna module by connecting an antenna array in millimeter wave band with integrated circuit chips, the antenna array and the integrated circuit chips may be positioned on the top layers of the respective substrates. However, as the number of antenna elements increases, this method increases the number of routings that need to be configured to connect each antenna to the integrated circuit chips. Therefore, it is very difficult to effectively configure an antenna array and make an arrangement for properly performing a beamforming function.

To solve this, Korean Patent No. 1581225 uses a double-sided package in which antenna elements are formed on the top layer of a substrate, and integrated circuit chips and BGAs for connecting the same are arranged at the opposite side of the substrate. Herein, in addition to a radio-frequency integrated circuit chip that is generally configured to be directly routed to an antenna, an additional integrated circuit chip for control and power supply are connected to other package substrates through ball grid arrays (BGAs).

That is, a plurality of antenna arrays are configured on the top layer of a package substrate, and a radio-frequency integrated circuit (RFIC) chip is placed at the opposite side of the package substrate in a face-up configuration, and each antenna element is correspondingly connected to an input/output line of the radio-frequency integrated circuit chip.

Herein, a feeding line of an antenna is configured using dielectric layers and metal layers inside a substrate.

This method of configuring an antenna module is called antenna-in-package because an antenna is configured together inside a package substrate. This configuration method allows a shorter length of a signal transfer line between an antenna and an RFIC, thus reducing an ultra-high frequency signal loss.

In addition, an integrated circuit chip, such as an RFIC, is on the opposite side of a substrate from an antenna array, so control and power lines of the integrated circuit may be arranged as metal lines inside the package, rather than on the same side as the antenna.

On the other hand, in order to connect an additional passive device and connector routed to control and power lines of integrated circuit chips, a BGA may be used for connection to another package substrate.

In addition, in cases where it is necessary to implement a multi-layer antenna structure to improve the performance of the antenna, and in cases where an antenna signal transmission structure implements a multi-layer structure to avoid interference with the control and power lines, such the structure become more complex and difficult to wire as an antenna array increases, and the number of layers of the package substrate increases significantly. As the number of layers of a substrate increases, it is more difficult to dissipate heat generated by high-power devices through a package substrate.

In addition, all signal lines of an antenna and an RFIC chip are configured at one package substrate, so an evaluation of characteristics is made only in the form in which the characteristics of an RF signal line of the RFIC chip and the characteristics of the antenna are in combination. That is, it is impossible to evaluate the characteristics of an antenna array only, or evaluate the characteristics of an RF signal line of an RFIC chip individually. In addition, defects caused by design and manufacturing processes cannot be evaluated individually, making it difficult to identify and improve the defects, and improve yield. In addition, there is no way to evaluate and detect defects in high-power devices such as RFIC chips and their accessory components and lines during the use of an antenna module.

In addition, routing parts of control and power lines of an antenna and RFIC chips must be configured together, so there is a limitation in using a material substrate suitable for the characteristics of the antenna. That is, when a package substrate made of a material with a low dielectric loss in an ultra-high frequency band is applied, the package substrate is very expensive, has poor rigidity, and is limited in configuring a substrate in multiple layers.

Accordingly, a method of separately manufacturing a substrate in which an antenna is configured and a PCB package substrate in which a radio-frequency integrated circuit chip is configured and bonding the substrates for connection is presented.

According to Korean Patent No. 2145219, in configuring an antenna module, in order to provide an antenna module that is advantageous for improving antenna performance or reducing size, a method is proposed in which separately from a PCB package substrate in which a semiconductor chip, such as a radio-frequency integrated circuit chip, is placed and related circuits are formed, an antenna substrate at which an antenna array and a part of a feeding structure thereof are formed is electrically connected using a bonding method.

Typically, a feeding metal via directly connected to each antenna to transfer an RF signal and a metal via directly connected to a radio-frequency integrated circuit chip to transfer an RF signal are electrically connected and fixed using ball-shaped bumps.

In this way, the antenna substrate and the package substrate at which an RFIC chip is placed may be connected by bumps, or an interposing substrate may be further provided therebetween and rewired for connection. However, ball-shape bumps are necessarily used to connect electrically and fix between the substrates.

Herein, as the number of antenna elements increases, the number of bumps for signal transfer and substrate attachment increases. In addition, as the operating frequency increases, the size of a required bump decreases.

This method of connecting the package substrate on top of the antenna substrate is a type of package-on-package method, which has the advantage of using different materials for the antenna substrate and the package substrate with the radio frequency integrated circuit chip because the antenna substrate and the package substrate are made separately.

Therefore, in order to improve characteristics such as antenna gain, an antenna and an antenna feeding structure may be effectively designed in multiple layers, and the material of the substrate may also be effectively selected.

However, not only the antenna signal line feed vias, but also the ground vias need to be perfectly connected with the bumps, which adds to the complexity of the fabrication process for these multiple bumped connections.

In addition, impedance mismatches may occur due to a bump for connection of an antenna signal line, and loss of an ultra-high frequency signal may increase. In addition, when heat generation of an integrated circuit chip for high power becomes severe, a bonding structure between each package substrate becomes warped due to the difference in thermal expansion coefficients of the substrates, causing many defect problems that the bonding of the bumps falls off during long-term use.

The above information disclosed in this Background section is only for understanding of the background of the inventive concepts, and, therefore, it may contain information that does not constitute prior art.

SUMMARY

The present disclosure has been made keeping in mind the above problems occurring in the related art, and the present disclosure is directed to providing an antenna module capable of achieving high performance in an ultra-high frequency band above 10 GHz.

In addition, the present disclosure is directed to providing a transmission structure having a low loss during signal transmission between an antenna and an RFIC chip by applying an interconnection member in which a slot structure is formed, between an antenna substrate in which an antenna array is formed and a package substrate in which a radio-frequency integrated circuit (RFIC) chip is provided.

In addition, the present disclosure is directed to providing an antenna module with heat dissipation characteristics improved by coupling a heat dissipation means to at least one selected from the group of an antenna substrate, a package substrate, and an interconnection member.

In addition, the present disclosure is directed to providing an antenna module that solves problems of an ultra-high frequency signal loss and a bump connection defect that occur when a bump is used, by applying an interconnection member in which a slot structure is formed, between an antenna substrate and a package substrate to remove a bump bonding structure used for connection between an antenna substrate and a package substrate.

Furthermore, the present disclosure is directed to providing an antenna module with improved antenna performance by applying a dielectric material having a low dielectric loss to an antenna substrate and a package substrate.

In addition, the present disclosure is directed to providing an antenna module in which a ground layer and a signal transmission line are placed facing each other, so that an ultra-high frequency signal is more effectively transmitted.

In addition, the present disclosure is directed to providing an antenna module in which a trench space is formed at the lower surface of an interconnection member, thereby efficiently configuring signal routing and arrangement of devices.

In addition, the present disclosure is directed to providing an antenna module in which the exterior of an interconnection member is made of a metal material and the interior is made of a material having a lower density than that of the exterior, thereby facilitating heat dissipation and minimizing the load on a device.

The present disclosure is directed to providing an antenna module in which an interconnection member having a mutual alignment structure is coupled to an antenna substrate and a package substrate, so that the antenna substrate and the package substrate are individually inspected for the characteristics and then coupled.

According to the present disclosure, there is provided an antenna module including: an antenna substrate 100 including an antenna 110; a package substrate 200 to which a radio-frequency integrated circuit chip 210 is mounted, and in which a signal transmission line 220 configured to transmit a signal of the radio-frequency integrated circuit chip is provided; and an interconnection member 300 positioned between the antenna substrate 100 and the package substrate 200 to connect the antenna substrate 100 and the package substrate 200, and provided with a slot 310 through which a radio frequency signal passes.

In addition, in the antenna substrate 100, a plurality of the antennas 110 may be placed, and the plurality of the antennas may be placed spaced a predetermined distance apart from each other to provide an antenna array.

In addition, the antenna substrate 100 may include a first shielding part 120 disposed at an edge of the slot 310, and the package substrate 200 may include a second shielding part 230 disposed at an edge of the slot 310.

In addition, a plurality of the first shielding parts 120 may be disposed to surround the slot 310 to provide a first radio frequency signal transmission part 101 in the center, and a plurality of the second shielding parts 230 may be disposed to surround the slot 310 to provide a second radio frequency signal transmission part 201 in the center.

In addition, the second shielding part 230 may include: a plurality of ground layers 231 spaced apart from each other; and a plurality of shielding vias 232 electrically connecting the ground layers 231, and any one ground layer selected from the plurality of ground layers 231 may be placed to face the slot 310 with the signal transmission line 220 therebetween.

In addition, the antenna substrate 100 may include a first coupling part 130 positioned between the antenna 110 and the slot 310 to transmit a radio frequency signal, and the package substrate 200 may include a second coupling part 240 of which one side is connected to the signal transmission line 220 and another side is positioned abutting the slot 310, the second coupling part transmitting a radio frequency signal.

In addition, first coupling part 131 and second coupling part 241 are arranged with their ends facing each other with the slot 310 therebetween.

In addition, the interconnection member 300 may include a trench space 320 provided on the underside of the interconnection member facing the package substrate 200.

In addition, an outer surface of the interconnection member 300 may be made of a conductor, and an inside of the interconnection member may be a dielectric.

In addition, the interconnection member 300 may include a slot member 330 provided at the slot 310, and the slot member 330 may be a dielectric.

In addition, a heat dissipation means 400 attached to a side of at least one selected from a group of the antenna substrate 100, the package substrate 200, and the interconnection member 300 may be further included.

In addition, the interconnection member 300 may include: a first interconnection member 300A coupled to a lower side of the antenna substrate 100; and a second interconnection member 300B coupled to an upper side of the package substrate 200, and the first interconnection member 300A and the second interconnection member 300B may be provided with alignment parts for aligning positions at which the first interconnection member and the second interconnection member are fastened to each other.

In addition, the interconnection member 300 may include a ridge-forming protrusion 340 provided projecting to the slot 310.

In addition, at least two ridge-forming protrusions 340 may be provided at an upper side and a lower side of the interconnection member 300, and the ridge-forming protrusions may have different shapes.

In addition, the ridge-forming protrusions 340 may include: a first ridge-forming protrusion 341 provided on the left side of the slot 310; and a second ridge-forming protrusion 342 provided on the right side of the slot 310.

In addition, the first ridge-forming protrusion 341 may include a 1-1 ridge-forming protrusion and a 1-2 ridge-forming protrusion that are respectively provided at the upper side and the lower side and have different shapes.

In addition, the second ridge-forming protrusion 342 may include a 2-1 ridge-forming protrusion and a 2-2 ridge-forming protrusion that are respectively provided at the upper side and the lower side and have different shapes.

In an antenna module according to the present disclosure, an antenna substrate and a package substrate are connected to each other through an interconnection member in which a slot through which a radio frequency signal passes is formed, so that a signal can be transmitted with reduced loss during signal transmission between an antenna and a signal transmission line of a radio-frequency integrated circuit (RFIC) chip.

In an antenna module according to the present disclosure, an antenna substrate and a package substrate are connected to each other through an interconnection member in which a slot through which a radio frequency signal passes is formed, thereby removing a packaging process of manufacturing multiple fine electrical-connection structures between an antenna and a signal transmission line of a radio-frequency integrated circuit chip.

In an antenna module according to the present disclosure, the antenna module is realized by connecting an antenna substrate and a package substrate through an interconnection member in which a slot through which a radio frequency signal passes is formed, so that the antenna substrate and the package substrate can be separately provided and respective substrate materials more suitable for the characteristics of the substrates can be used.

In an antenna module according to the present disclosure, an antenna substrate and a package substrate are connected to each other through an interconnection member in which a slot through which a radio frequency signal passes is formed, so that the antenna substrate and an electrical connection structure of the package substrate can be prevented from being separated from each other because of excessive heat generation.

In an antenna module according to the present disclosure, an interconnection member of which a front or outer surface is a conductor (metal layer) is applied to connection between an antenna substrate and a package substrate, so that heat dissipation can be smooth through the interconnection member that is a conductor, thereby further improving heat dissipation characteristics.

In an antenna module according to the present disclosure, an antenna substrate and a package substrate are connected to each other through an interconnection member in which a slot through which a radio frequency signal passes is formed, so that the characteristics and defects of an antenna can be measured and analyzed, or the characteristics and defects of the package substrate and individual radio-frequency integrated circuit chips and each signal transmission line connected thereto can be individually measured and analyzed, thereby detecting defects and improving yield.

In addition, a signal transmission line of a radio-frequency integrated circuit chip is placed inside a package substrate, and a ground layer is placed facing one side of the package substrate to reflect a radio frequency signal, thereby further improving signal transmission efficiency.

Furthermore, in an interconnection member in which a slot is formed, a coupling part of an antenna substrate and a coupling part of a package substrate are placed facing each other to strengthen electromagnetic coupling and transmit a radio frequency signal, thereby improving signal transmission efficiency.

In addition, a trench space is formed in an interconnection member, so that a radio-frequency integrated circuit (RFIC) chip, other integrated circuit (IC) chips, a passive device, and a connector that are mounted to a package substrate can be placed on the side of the interconnection member 300, thereby effectively configuring the routing and arrangement of the package substrate.

In addition, a slot formed in an interconnection member is filled with a dielectric of which a dielectric constant is higher than air, so the size of the slot can be minimized.

Furthermore, a heat dissipation means at which a heat dissipation pin is formed can be attached to an edge of an antenna module, so that heat dissipation can be better performed, thereby preventing degradation of power loss and the deformation of the substrates.

In addition, an interconnection member in which an alignment part is formed is detachably coupled to an antenna substrate and a package substrate, so that the characteristics of the antenna substrate and the package substrate can be individually inspected and then the antenna substrate and the package substrate having normal characteristics can be selected and coupled.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the inventive concepts.

DETAILED DESCRIPTION

Figure 1:
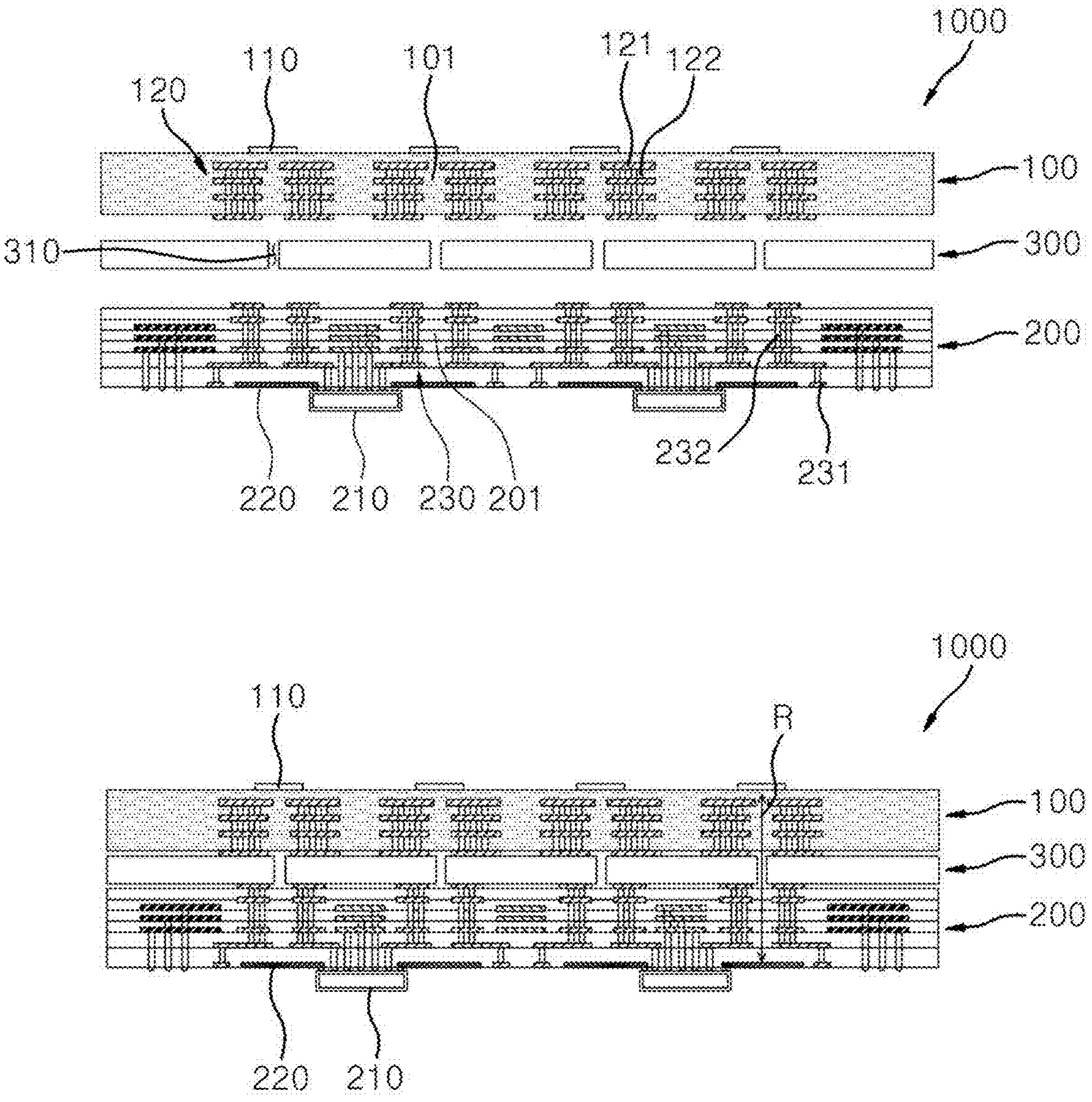
FIG. 1 is a diagram illustrating an antenna module according to a first embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, “at least one of X, Y, and Z” and “at least one selected from the group consisting of X, Y, and Z” may be construed as X only, Y only, Z only, or any combination of two or more of X, Y, and Z, such as, for instance, XYZ, XYY, YZ, and ZZ. As used herein, the term “and/or” includes any and all combinations of one or more of the associated listed items.

Although the terms “first,” “second,” etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as “beneath,” “below,” “under,” “lower,” “above,” “upper,” “over,” “higher,” “side” (e.g., as in “sidewall”), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as “below” or “beneath” other elements or features would then be oriented “above” the other elements or features. Thus, the exemplary term “below” can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, “a,” “an,” and “the” are intended to include the plural forms as well, unless the context clearly indicates otherwise. Moreover, the terms “comprises,” “comprising,” “includes,” and/or “including,” when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms “substantially,” “about,” and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of idealized embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the inventive concepts. Further, the blocks, units, and/or modules of some embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2A:
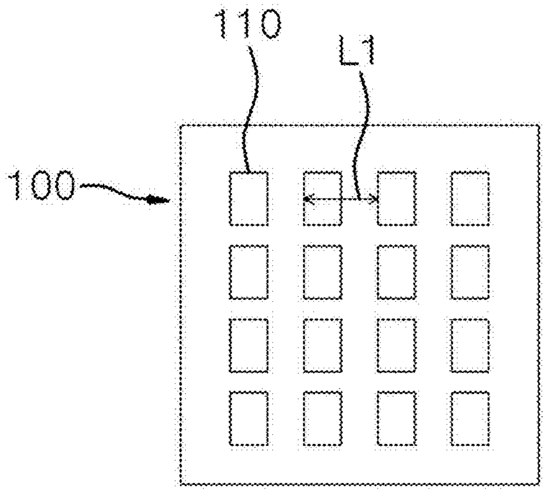
FIGS. 2A and 2B are diagrams illustrating an antenna substrate and an interconnection member of an antenna module according to the present disclosure.
Figure 2B:
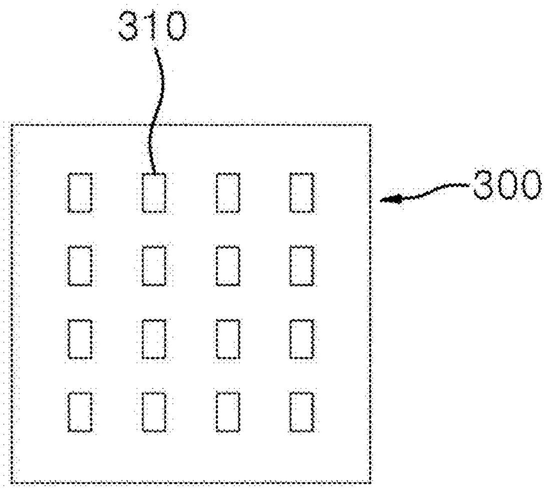

FIG. 1 is a diagram illustrating an antenna module according to a first embodiment of the present disclosure. FIGS. 2A and 2B are diagrams illustrating an antenna substrate and an interconnection member of an antenna module according to the present disclosure.

Referring to FIG. 1, an antenna module 1000 according to a first embodiment may include: an antenna substrate 100 including an antenna 110; a package substrate 200 to which a radio-frequency integrated circuit chip 210 is mounted, and in which a signal transmission line 220 for transmitting a signal of a radio-frequency integrated circuit is formed; and an interconnection member 300 positioned between the antenna substrate 100 and the package substrate 200 to connect the antenna substrate 100 with the package substrate 200, and in which a slot 310 through which a radio frequency signal passes is formed.

More specifically, regarding the transmitting of the antenna, when a high frequency signal in a radio frequency band from the radio-frequency integrated circuit chip 210 mounted to the package substrate 200 is transferred through the signal transmission line, the antenna 110 emits electromagnetic waves having characteristics, such as a pre-designed band and beam width. Regarding the receiving of the antenna, when the antenna 110 receives electromagnetic waves, the received signals are transmitted to the radio-frequency integrated circuit chip 210.

Herein, the less the signal loss occurring in the radio frequency signal transfer process between the antenna 110 and the radio-frequency integrated circuit chip 210, the better the performance of the antenna module, such as transmission and reception output. Thus, according to the present disclosure, as shown in FIG. 1, the interconnection member 300 in which the slot 310 is formed is positioned between the antenna substrate 100 and the package substrate 200 to make a passage through which a radio frequency signal passes with low loss, thereby making more effective transmission of a radio frequency signal between the antenna 110 and the signal transmission line 220 of the radio-frequency integrated circuit chip.

In addition, the antenna substrate 100 and the package substrate 200 are connected to each other through the interconnection member in which the slot 310 through which a radio frequency signal passes is formed, thus avoiding a packaging process, which is a conventional antenna module package connection method, in which multiple fine electrical connection structures are manufactured between the antenna 110 and the signal transmission line 220 of the radio-frequency integrated circuit chip.

In addition, in the antenna module of the present disclosure, the antenna substrate 100 and the package substrate 200 are connected to each other through the interconnection member 300 in which the slot 310 through which a radio frequency signal passes is formed, thus preventing the problem of an antenna module in the related art that an electrical connection structure, such as a fine ball-shaped bump, of an antenna substrate and a package substrate is separated by the heat generated due to long-term module operation.

In addition, since the antenna module is implemented by connecting the antenna substrate 100 with the package substrate 200 through the interconnection member in which the slot 310 through which a radio frequency signal passes is formed, the antenna substrate and the package substrate are implemented separately, thus enabling the antenna substrate and the package substrate to use substrate materials more suitable for their respective characteristics In addition, the front or outer surface of the interconnection member 300 of the present disclosure is implemented with a conductor (metal layer) to enable the effective dissipation of heat from a substrate to through the interconnection member, thereby further enhancing the heat dissipation characteristics.

In addition, in the antenna module of the present disclosure, since the antenna substrate 100 and the package substrate 200 are connected through the interconnection member 300 in which the slot through which a radio frequency signal passes is formed, the characteristics and defects of the antenna are measured and analyzed, or the characteristics and defects of the package substrate and individual radio-frequency integrated circuit (RFIC) chips and each signal transmission line connected thereto are individually measured and analyzed, thereby enabling the detection of defects and improving yield.

Herein, as shown in FIG. 2A, a plurality of the antennas 110 may be placed at the antenna substrate 100 to form an antenna array, and such an antenna array may be configured in multiple layers.

The antenna 100 may be manufactured by forming (patterning) a metal layer on or inside the antenna substrate 100, or may be manufactured separately and coupled on the top surface of antenna substrate.

In addition, as shown in FIG. 2B, for the plurality of slots 310 formed in the interconnect member 300, the same number may be formed as the antenna 110, and may be arranged in a manner corresponding to the antennas 110 one by one when the interconnect member 300 is coupled to the antenna substrate 100.

It is preferable that the interconnection member 300 has one or more slots 310 therein and the surfaces of the slots are implemented as conductors so that electromagnetic waves are transmitted without loss. The interconnection member 300 is perforated the top and the bottom thereof and is hollow to allow electromagnetic waves to be transmitted well up and down. That is, the slot may be implemented in a waveguide-like shape with an empty inside, such as a slim quadrangular square, "[" square, or "H" square. In addition, the slot may be implemented in the shape with a plurality of ridges to set a pass frequency band.

When an antenna array is formed using a plurality of antennas 110, it is most preferable that considering the gain of the antenna array and the adjustment of the angle of a beam, the placing interval L1 between the antennas 110 is formed to be half a wavelength (0.5 times the wavelength) of the frequency band mainly used. However, when necessary, the placing interval may be other intervals, such as 0.55 or 0.6 times. This interval may be adjusted according to the arrangement space of the radio-frequency integrated circuit chip 210 and related circuit.

In addition, the antenna substrate 100 has the advantage of reducing the transmission loss of the radio frequency signal if it is made of a substrate having a low dielectric loss. Therefore, it is recommended that the antenna substrate is made in the form of a plurality of dielectric layers having a low dielectric loss. In one embodiment, it is recommended that a dielectric forming a dielectric layer is Teflon material for ultra-high frequencies having a low dielectric loss in the millimeter wave band. In addition thereto, a dielectric may be low-temperature-fired ceramics, high-temperature-fired ceramics, or alumina that are advantageous for forming multiple layers.

In addition to the plurality of dielectric layers, the antenna substrate 100 may include a plurality of metal layers and vias connecting the metal layers vertically.

In addition, the package substrate 200 on which the radio frequency integrated circuit (RFIC) chip is mounted may be fabricated from a plurality of dielectrics laminated together, or, if desired, may be formed from a heterojunction of various materials rather than a single material.

Furthermore, in addition to the radio-frequency integrated circuit chip 210 and the signal transmission line 220, the package substrate 200 may include various integrated circuit (IC) chips, such as a power amplifier and a mixer, various passive devices, such as an inductor, a capacitor, and a resistor, and a connector for connection.

In the package substrate, a metal layer and a connection via may be formed, and may be used to place the signal transmission wiring for transmitting radio frequency signals, and metal wiring, a ground layer, and a shielding structure for routing power and control signals.

The package substrate may transmit signals in a high-frequency band as well as various analog signals, such as power and a control signal, and may include radio-frequency integrated circuit chips, various integrated circuit chips, passive devices, and connectors. Therefore, there are requirements for low dielectric loss so that the signal attenuation in the radio frequency band is low, good mechanical rigidity so that the substrate does not warp due to various processes and heat generation, and high material cost because the substrate is made of a multi-layer structure. In addition, as the radio frequency band increases, the integration of devices increases further and the wiring becomes more complicated to implement, so the characteristics of the above requirements become even more necessary.

However, materials such as Teflon, which are commonly used because of a low dielectric loss at ultra-high frequencies, have bad mechanical rigidity and are very costly when implemented in multiple layers, while materials such as FR4, which are used cheaply at low frequencies, have relatively good mechanical rigidity and are easy to be implemented in multiple layers, but have very high dielectric loss at ultra-high frequencies, making these materials difficult to apply.

Therefore, it is difficult to satisfy these various requirements when applying a single dielectric material, so substrates having a heterojunction structure may be implemented by applying different types of dielectrics, but it is difficult to implement a multi-layer structure and the manufacturing cost increases significantly.

Referring to FIG. 1, the antenna substrate 100 may include a first shielding part 120 disposed at the edge of the slot 310, and the package substrate 200 may include a second shielding part 230 disposed at the edge of the slot 310.

More specifically, the first shielding part 120 and the second shielding part 230 are used to form a radio frequency signal transmission structure between the antenna 110 and the signal transmission line 220 placed facing each other, thereby minimizing the transmission loss of a radio frequency signal (R) and simultaneously blocking signal interference with radio frequency signals transmitted between another antenna and the signal transmission line 220 and analog signals used for device operation.

Herein, it is recommended that a plurality of the first shielding parts 120 are disposed to surround the slot 310 to form a first radio frequency signal transmission part 101 with the center into which the inflow of external signals is blocked, and a plurality of the second shielding parts 230 are disposed to surround the slot 310 to form a second radio frequency signal transmission part 201 with the center into which the inflow of external signals is blocked.

That is, the first shielding part 120 and the second shielding part 230 that have a material or structure capable of shielding electromagnetic waves in the transmitting and receiving frequency band form the first radio frequency signal transmission part 101 and the second radio frequency signal transmission part 201 at the antenna substrate 100 and the package substrate 200, respectively, to avoid interference from external signals.

The first radio frequency signal transmission part 101 and the second radio frequency signal transmission part 201 refer to a particular area of the antenna substrate 100 and a particular area of the package substrate 200 surrounded by the first shielding part 120 and the second shielding part 230, respectively. A plurality of the first radio frequency signal transmission part 101 and the second radio frequency signal transmission part 201 may be formed corresponding to the number of input/output ports of the antenna 110 and the radio-frequency integrated circuit chip 210.

Furthermore, the first shielding part 120 may include a plurality of metal layers 121 spaced apart from each other and a plurality of first shielding vias 122 connecting the plurality of metal layers 121. The second shielding part 230 may include a plurality of ground layers 231 spaced apart from each other and a plurality of second shielding vias 232 electrically connecting the ground layers 231.

Figure 3:
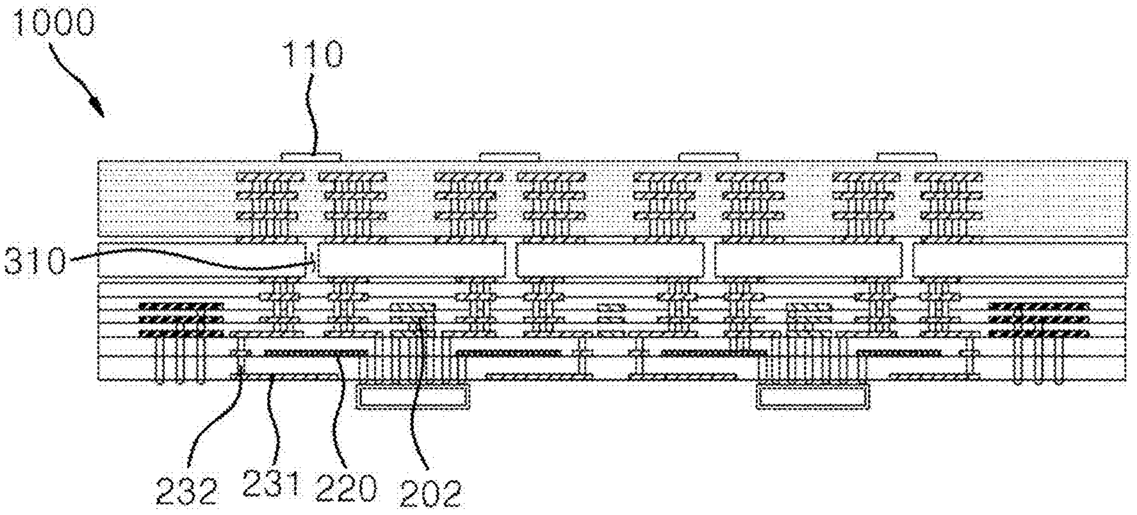
FIG. 3 is a diagram illustrating an antenna module according to a second embodiment of the present disclosure.

FIG. 3 is a diagram illustrating an antenna module according to a second embodiment of the present disclosure. Referring to FIG. 3, in an antenna module 1000 according to a second embodiment, any one ground layer selected from the plurality of ground layers 231 constituting the second shielding part 230 may be placed to face the slot 310 with the signal transmission line 220 therebetween.

More specifically, a signal transmission line 220 connected to a radio-frequency integrated circuit chip is disposed inside a package substrate 200 and a ground layer 231 is placed at the rear side of the signal transmission line 220 so that the ground layer 231 disposed at the rear side reflects applied radio frequency signals, thereby improving the efficiency of transmission of radio frequency signals.

Herein, the arrangement and connection of the ground layer 231, a second shielding via 232, and a power and control signal line 202 need to be in the optimal form to avoid interference with each other.

Figure 4:
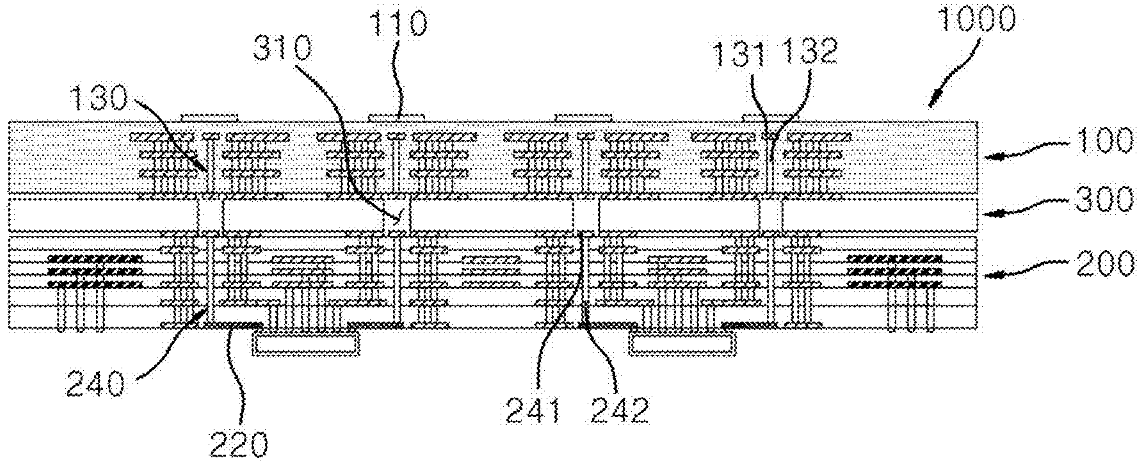
FIG. 4 is a diagram illustrating an antenna module according to a third embodiment of the present disclosure.

FIG. 4 is a diagram illustrating an antenna module according to a third embodiment of the present disclosure. Referring to FIG. 4, the antenna substrate 100 of an antenna module 1000 according to a third embodiment may include a first coupling part 130 positioned between the antenna 110 and the slot 310 to transmit a radio frequency signal, and the package substrate 200 may include a second coupling part 240 of which one side is connected to the signal transmission line 220 and another side is positioned abutting the slot 310, the second coupling part transmitting a radio frequency signal.

More specifically, radio frequency signals are transmitted through the first coupling part 130 and the second coupling part 240 that have a greater capability of signal transmission than the antenna substrate 100 and the package substrate 200, so that the efficiency of transmission of radio signals is improved. That is, in the interconnection member with the slot formed, the first coupling part 130 of the antenna substrate and the coupling part 240 of the package substrate are arranged facing each other to strengthen electromagnetic coupling and transmit radio frequency signals, thereby improving signal transmission efficiency.

Herein, it is recommended that respective ends of the first coupling part 130 and the second coupling part 240 are arranged facing each other with the slot 310 therebetween within the first radio frequency signal transmission part 101 and the second radio frequency signal transmission part 201, respectively.

In addition, the first coupling part 130 may include a first coupling pattern 131 for radiating a radio frequency signal, and a first connection via 132 for forming a passage through which a radio frequency signal is transmitted. The second coupling part 240 may include a second coupling pattern 241 for radiating a radio frequency signal, and a second connection via 242 for forming a passage through which a radio frequency signal is transmitted.

Figure 5:
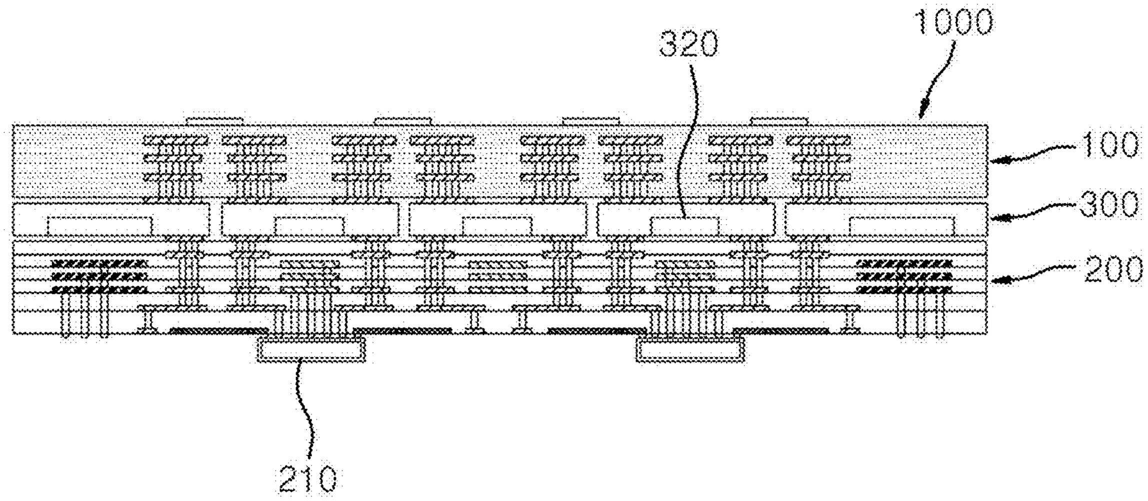
FIG. 5 is a diagram illustrating an antenna module according to a fourth embodiment of the present disclosure.

FIG. 5 is a diagram illustrating an antenna module according to a fourth embodiment of the present disclosure. Referring to FIG. 5, the interconnection member 300 of an antenna module 1000 according to a fourth embodiment may have a trench space 320 formed on the underside of facing the package substrate 200.

More specifically, in the case of the package substrate 200, radio-frequency integrated circuit chips 210, other integrated circuit chips, passive devices, connectors, and signal transmission lines are formed. Forming these components on the bottom side has the problems that connection wiring is complex, especially towards the bottom side, and there are many wiring layers inside the package substrate 200 for electrical connection. Therefore, the trench space 320 is formed on the underside of the interconnection member 300 facing the package substrate 200, so that components such as the radio-frequency integrated circuit chips 210, the passive devices, the connectors, and the signal transmission lines may be arranged at the upper surface of the package substrate 200 adjacent to the antenna substrate 100.

As described above, when the trench space 320 enables free arrangement of components, a power and control signal line 202 may be formed easily on the bottom side of the package substrate 200. Thus, analog signal routing wiring is far from the signal transmission line 220 and analog signals of the power and control signal line 202 do not interference with a radio frequency signal.

Therefore, when a passage through which a radio frequency signal is transmitted is adjacent to analog signal routing wiring, signal interference occurs, making it difficult to realize an antenna module in millimeter wave band, which is an ultra-high frequency. Accordingly, the trench space is capable of solving the problem that the antenna module 1000 needs to be configured in more layers to secure adequate arrangement space. That is, using the trench space in the interconnection member, part of radio-frequency integrated circuit chips (RFICs), other integrated circuit chips, passive devices, and connectors that are mounted to the package substrate may be placed on the surface coupled to the interconnection member 300 within the trench space when necessary, thereby effectively configuring the routing and arrangement of the package substrate.

Figure 6A:
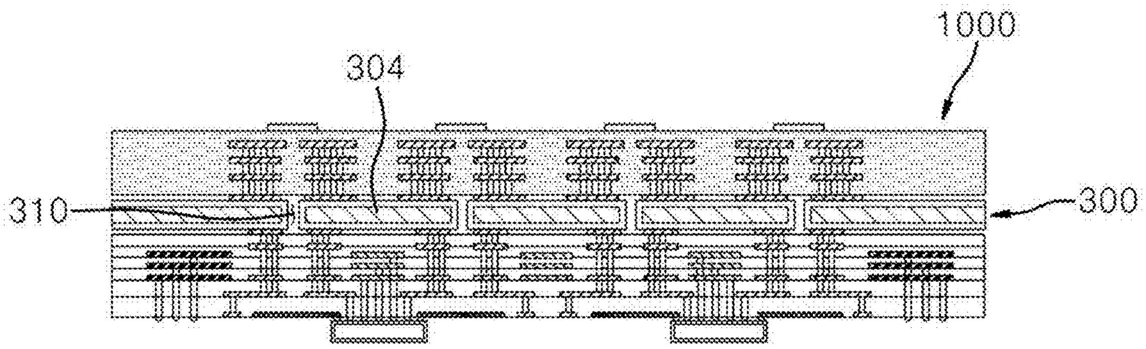
FIGS. 6A and 6B are diagrams illustrating an antenna module according to a fifth embodiment of the present disclosure.
Figure 6B:
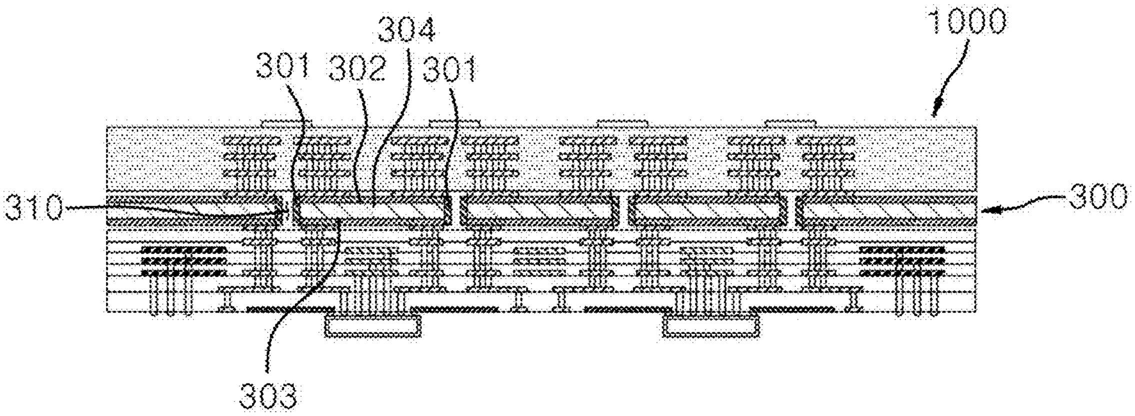

FIGS. 6A and 6B are diagrams illustrating an antenna module according to a fifth embodiment of the present disclosure. Referring to FIG. 6A, the interconnection member 300 of an antenna module 1000 according to a fifth embodiment has an outer surface formed of a conductor and the inside formed of different types of materials that are less dense than the conductor.

More specifically, since the interconnection member 300 is required to shield a radio frequency signal passing through the slot 310, it is necessary for the interconnection member to be formed of a conductor (metal) material capable of fencing electromagnetic waves. However, when the entire interconnection member 300 is formed of a conductor material, the load on the antenna module is increased. Therefore, only a particular portion that requires fencing of electromagnetic waves may be formed of a conductor material and the inside 304 that does not require fencing of electromagnetic waves may be formed of different types of materials (an insulator, such as a dielectric, a foamed metal, and a flexible material), thereby minimizing weight.

In addition, the outer surface of the interconnection member 300 may not be formed entirely of the same material, but may be formed of a plurality of materials. In one embodiment, as shown in FIG. 6B, the outer surface 301 of the inside touching the slot 310 may be formed of a metal having high conductive characteristics, while the upper surface 302 and the lower surface 303 may be formed of a metal having high thermal conductivity so that heat dissipation is effective. It is apparent that metals generally have a very high thermal conductivity than dielectrics, which allows for effective heat dissipation through the interconnection member 300.

Herein, the metal having high conductive characteristics and the metal having high thermal conductivity may include Al, Cu, Ag, or an alloy of these metals, but without being limited thereto, may include various other metals.

Figure 7:
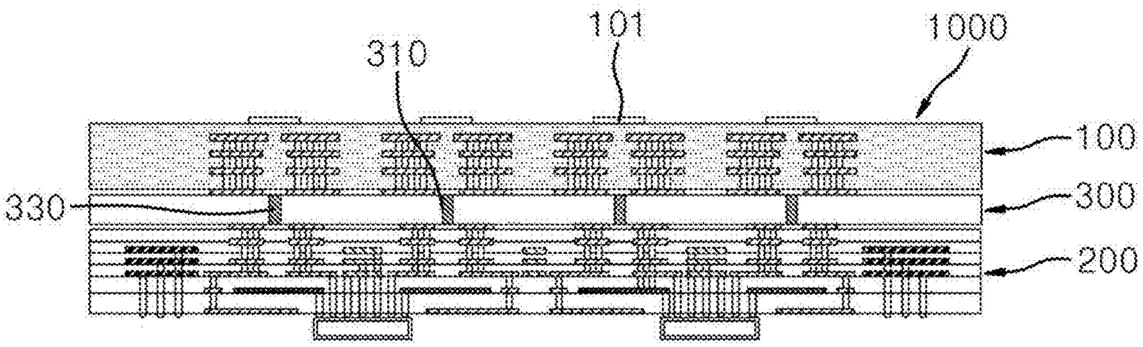
FIG. 7 is a diagram illustrating an antenna module according to a sixth embodiment of the present disclosure.

FIG. 7 is a diagram illustrating an antenna module according to a sixth embodiment of the present disclosure. Referring to FIG. 7, the interconnection member 300 of an antenna module 1000 according to a sixth embodiment may include a slot member 330 provided at the slot 310, and the slot member 330 may be a dielectric.

More specifically, as described above with reference to the first embodiment, the antenna module 1000 according to the present disclosure minimizes transmission loss occurring in the radio frequency signal transfer process between the antenna 110 or the signal transmission line 220 as a radio frequency signal becomes directional in the process of passing through the slot 310.

Herein, the air positioned in the slot 310 is used as a medium through which a radio frequency signal is transferred, but there is a problem that the size of the slot 310 needs to be at least a predetermined size or greater when air is used as a medium. Therefore, according to the present disclosure, the slot 310 is filled with a slot member 330 having a higher dielectric constant than air so that the same capability of transmission of radio frequency signals is provided even if the size of the slot 310 is reduced.

The structure and size of the slot need to be designed matched to the frequency band of the antenna module. The size of the slot using air of which a dielectric constant is 1 is realized relatively larger than that of the slot filled with a material having a high dielectric constant. When the slot is realized in a reduced size, a wide trench space is used to facilitate arrangement, or a wide conductive layer is realized to improve heat dissipation characteristics. Therefore, since the slot is filled with a dielectric of which a dielectric constant is higher than air, the size of the slot may be minimized. As the slot member, various materials such as FR4 and Teflon, which are commonly used as dielectric materials for substrates, may be applied.

Figure 8:
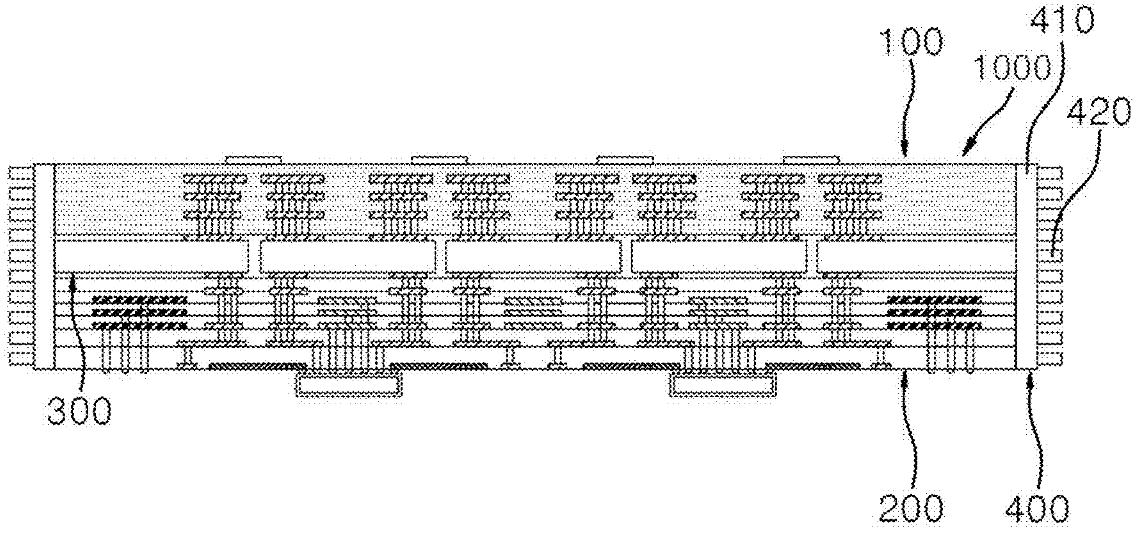
FIG. 8 is a diagram illustrating an antenna module according to a seventh embodiment of the present disclosure.

FIG. 8 is a diagram illustrating an antenna module according to a seventh embodiment of the present disclosure. Referring to FIG. 8, an antenna module 1000 according to a seventh embodiment may include a heat dissipation means 400 attached to a side of at least one selected from the group of the antenna substrate 100, the package substrate 200, and the interconnection member 300.

More specifically, the antenna module 1000 according to the present disclosure performs communication using a high-power of signal generation device, so heat is generated from high-power devices. When the heat generated from the high-power devices increases to a predetermined value or more, the characteristics of the devices may be changed and the modules, such as the package substrate and the antenna substrate, may be physically deformed. Therefore, in the present disclosure, heat dissipation is effectively performed through the heat dissipation means 400.

In other words, in the case of the antenna substrate 100 and the package substrate 200, the lower the dielectric loss, the lower the radio frequency signal loss. However, there is a problem that the materials, such as Teflon, with a low dielectric loss are expensive and easily deformed by heat due to low thermal conductivity and mechanical characteristics. Therefore, heat is dissipated through the heat dissipation means 400 to reduce the output loss of the antenna module caused by heat generation and prevent the deformation of the antenna substrate 100 and the package substrate 200.

Herein, the heat dissipation means 400 may include a heat dissipation pad 410 attached to surround the side of the antenna module 1000 in which the antenna substrate 100, the package substrate 200, and the interconnection member 300 are formed coupled thereto, and a plurality of heat dissipation pins 420 formed spaced apart from each other at the outer side of the heat dissipation pad 410.

In addition, when the outer surface of the interconnection member 300 is formed of a metal having a high thermal conductivity, heat transfer to the heat dissipation means 400 may be more effective.

Figure 9:
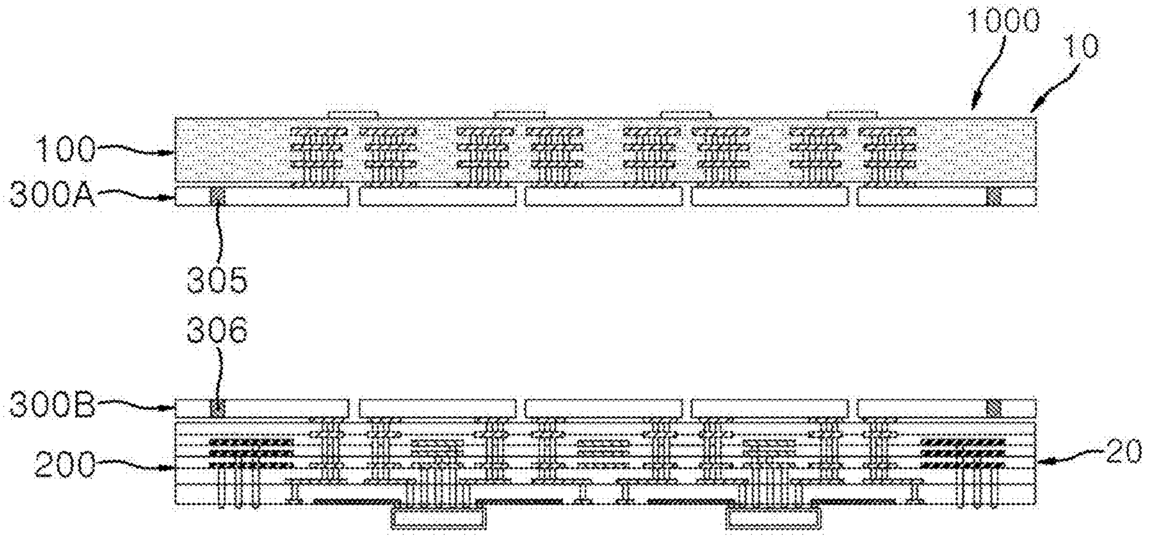
FIG. 9 is a diagram illustrating an antenna module according to an eighth embodiment of the present disclosure.

FIG. 9 is a diagram illustrating an antenna module according to an eighth embodiment of the present disclosure. Referring to FIG. 9, an antenna module 1000 according to an eighth embodiment includes a first interconnection member 300A coupled to the lower side of the antenna substrate 100, and a second interconnection member 300B coupled to the upper side of the package substrate 200. The first interconnection member 300A and the second interconnection member 300B may be formed with alignment parts 305 and 306 for aligning the positions at which the first interconnection member 300A and the second interconnection member 300B are fastened to each other.

More specifically, a conventional antenna package module integrated with an antenna is manufactured in a form in which an antenna pattern is formed on a package substrate and implemented together, so the characteristics (state) of the antenna module as a whole may be identified, but the characteristics of each of the antenna, the signal connection part of the antenna, the radio-frequency integrated circuit chip, and the signal connection part connected to the radio-frequency integrated circuit chip cannot be identified individually. Therefore, if the characteristic inspection results are found to be defective, the entire antenna module must be discarded, so the defect cannot be identified and improved individually, and the unit cost is high and the mass production yield is low.

Therefore, in the present disclosure, the first interconnection member 300A is coupled to the lower side of the antenna substrate 100 to form a first assembly module 10, and the second interconnection member 300B is coupled to the upper surface of the package substrate 200 to form a second assembly module 10. Next, the characteristics of the antenna substrate 100 and the package substrate 200 are inspected separately, and the antenna substrate 100 and the package substrate 200 that are determined to be in normal states by the inspection of the characteristics are coupled to each other to increase the mass production yield of the antenna module.

In particular, the output characteristics of the radio-frequency integrated circuit chip 210, the signal connection line 220 thereof, and the signal transmission part 232 may be individually analyzed using measurement equipment, so that a defect of the radio-frequency integrated circuit chip or a defect of the signal transmission part may be easily recognized. In addition, the degradation in power of the radio-frequency integrated circuit chip after long-term operation may be identified, and only the radio-frequency integrated circuit chip may be replaced.

It is apparent that without using the interconnection member depending on the necessity and convenience, it is also possible to evaluate and analyze the characteristics of the antenna substrate and the package substrate separately in the configuration of the antenna module of the present disclosure.

Herein, it is recommended that the alignment parts 305 and 306 are formed at the first interconnection member 300A and the second interconnection member 300B so that alignment and coupling are easily performed after the inspection of characteristics.

The alignment parts may include various means for aligning coupling positions. In one embodiment, the alignment parts may include an alignment projection formed at either the first interconnection member 300A or the second interconnection member 300B, and an alignment groove formed at the position facing the alignment projection.

As one example, when an alignment projection is formed at the lower surface of the first interconnection member 300A and an alignment groove is formed at the upper surface of the second interconnection member 300B, the alignment projection is fitted into the alignment groove so that fastening positioned are aligned.

Figure 10:
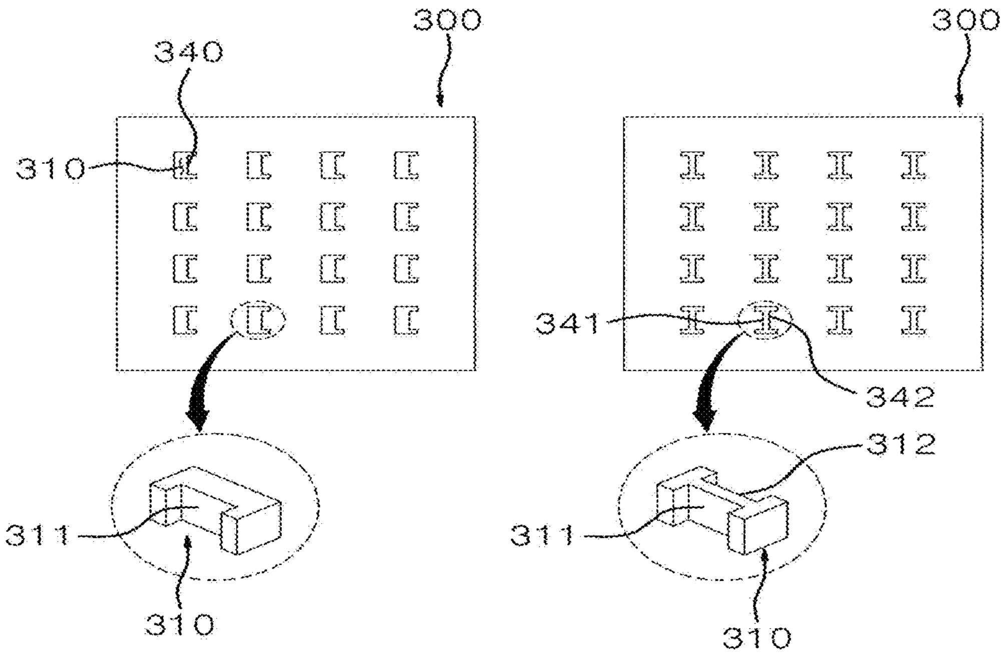
FIGS. 10 and 11 are diagrams illustrating a slot structure formed at an interconnection member of an antenna module according to the present disclosure.
Figure 11:
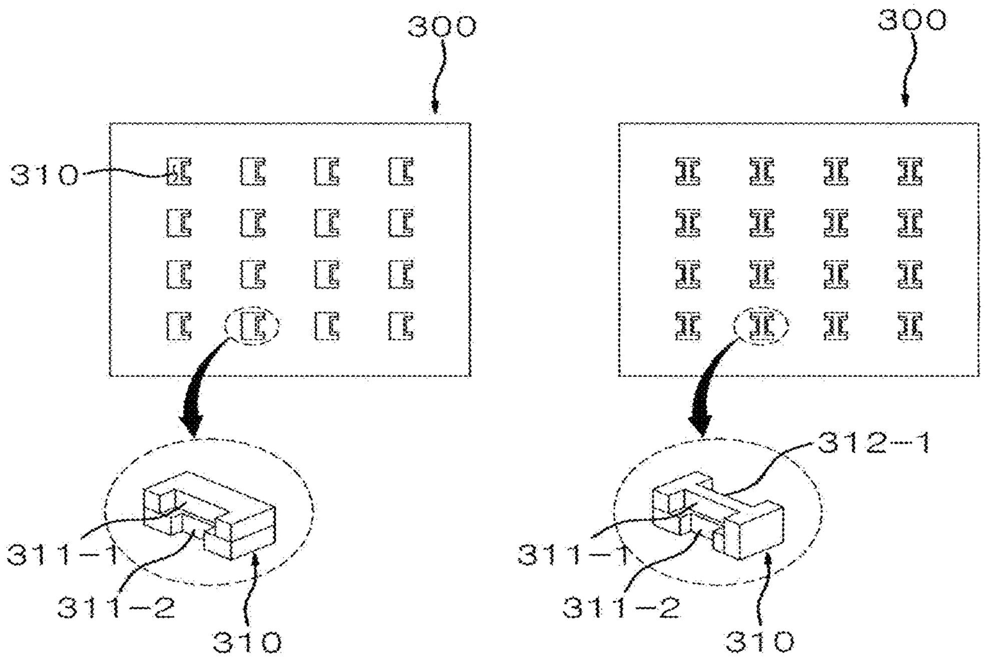

FIGS. 10 and 11 are diagrams illustrating a slot structure formed at an interconnection member of an antenna module according to the present disclosure. Referring to FIGS. 10 and 11, the interconnection member 300 may include a ridge-forming protrusion 340 formed projecting to the slot 310.

More specifically, a partial region of the slot 310 is formed thin through the ridge-forming protrusion 340, so that the frequency band of electromagnetic waves passing through the slot 310 may be adjusted or transmission characteristics may be improved.

Herein, as shown in the left of FIG. 10, the ridge-forming protrusion 340 may be formed on either the left or right side of the slot 310. Alternatively, as shown in the right of FIG. 10, a first ridge-forming protrusion 341 formed on the left side and a second ridge-forming protrusion 342 formed on the right side may be included.

The left and the right of the slot 310 shown in partial enlargement in FIGS. 10 and 11 are reversed for more specific description. As shown in FIG. 11, when a plurality of ridge grooves are formed in the height direction of the slot 310, the heights of the ridge grooves may be various without limitation.

In addition, as shown in the left and the right of FIG. 11, the ridge-forming protrusion 340 may include a plurality of protrusions that are formed sequentially in the length direction of the slot 310 and have different shapes. More specifically, the first ridge-forming protrusion 341 may include a 1-1 ridge-forming protrusion and a 1-2 ridge-forming protrusion that are formed at the upper and lower sides and have different shapes, and the second ridge-forming protrusion 342 may include a 2-1 ridge-forming protrusion and a 2-2 ridge-forming protrusion that are formed at the upper and lower sides and have different shapes.

Furthermore, the slot 310 may have a ridge groove formed by the ridge-forming protrusion 340 as described above. As shown in FIG. 10, the ridge grooves may include a first ridge groove 311 formed by the first ridge-forming protrusion 341, a second ridge groove 312 formed by the second ridge-forming protrusion 342. As shown in FIG. 11, the ridge grooves may include a 1-1 ridge groove 311-1 formed by the 1-1 ridge-forming protrusion, a 1-2 ridge groove 311-2 formed by the 1-2 ridge-forming protrusion, a 2-1 ridge groove 312-1 formed by the 2-1 ridge-forming protrusion, and a 2-2 ridge groove formed by the 2-2 ridge-forming protrusion.

Although the ridge-forming protrusion 340 are shown having a quadrangular cross-sectional shape in the drawings, but the ridge-forming protrusion may have various shapes, such as an ellipse, a semicircle, and a polygon, and no limitation thereto is imposed.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. An antenna module, comprising:

an antenna substrate including an antenna;

a package substrate to which a radio-frequency integrated circuit chip is mounted, the package substrate including a conductive signal transmission line configured to transmit a signal from the radio-frequency integrated circuit chip; and an interconnection member positioned between the antenna substrate and the package substrate to connect the antenna substrate and the package substrate, the interconnection member including a slot through which a radio frequency signal from the radio-frequency integrated circuit chip is transmitted, wherein no portion of the conductive signal transmission line extends through the slot.

2. The antenna module of claim 1, wherein the antenna substrate includes a plurality of the antennas, and the plurality of the antennas are placed spaced a predetermined distance apart from each other to provide an antenna array.

3. The antenna module of claim 1, wherein the antenna substrate includes a first shielding part disposed at a first edge of the slot, and the package substrate includes a second shielding part disposed at a second edge of the slot.

4. The antenna module of claim 3, wherein a plurality of the first shielding parts are disposed to surround the slot to provide a first radio frequency signal transmission part in the center of the slot, and a plurality of the second shielding parts are disposed to surround the slot to provide a second radio frequency signal transmission part in the center of the slot.

5. The antenna module of claim 3, wherein the second shielding part includes: a plurality of ground layers spaced apart from each other; and a plurality of second shielding vias electrically connecting the ground layers, and any one ground layer selected from the plurality of ground layers is placed to face the slot with the signal transmission line therebetween.

6. The antenna module of claim 3, wherein the antenna substrate includes a first coupling part positioned between the antenna and the slot to transmit the radio frequency signal, and the package substrate includes a second coupling part of which one side is connected to the signal transmission line and another side is positioned abutting the slot, the second coupling part transmitting the radio frequency signal.

7. The antenna module of claim 6, wherein ends of the first coupling part and the second coupling part are placed facing each other with the slot therebetween.

8. The antenna module of claim 1, wherein the interconnection member includes a trench space provided on an underside of the interconnection member facing the package substrate.

9. The antenna module of claim 1, wherein an outer surface of the interconnection member is made of a conductor and an inside of the interconnection member is made of different types of materials having a lower density than the conductor.

10. The antenna module of claim 1, wherein the interconnection member includes a slot member provided at the slot, and the slot member is a dielectric.

11. The antenna module of claim 1, further comprising a heat dissipation means attached to a side of at least one selected from a group of the antenna substrate, the package substrate, and the interconnection member.

12. The antenna module of claim 1, wherein the interconnection member includes a ridge-forming protrusion provided projecting to the slot.

13. The antenna module of claim 12, wherein a plurality of the ridge-forming protrusions are provided, and the plurality of the ridge-forming protrusions (340) have different sizes and shapes.

14. An antenna module, comprising:

an antenna substrate including an antenna;

a package substrate to which a radio-frequency integrated circuit chip is mounted, the package substrate including a conductive signal transmission line configured to transmit a signal from the radio-frequency integrated circuit chip; and an interconnection member positioned between the antenna substrate and the package substrate to connect the antenna substrate and the package substrate, the interconnection member including a slot through which the signal from the radio-frequency integrated circuit chip is transmitted, wherein the interconnection member includes: a first interconnection member coupled to a lower side of the antenna substrate; and a second interconnection member coupled to an upper side of the package substrate, and the first interconnection member and the second interconnection member are provided with alignment parts for aligning positions at which the first interconnection member and the second interconnection member are fastened to each other.

* * * * *